United States Patent [19]

Jany et al.

[11] Patent Number: 4,981,642

[45] Date of Patent: Jan. 1, 1991

[54] APPARATUS FOR FORM-LOCKING TORSION PREVENTION IN SCREW CONNECTIONS

[75] Inventors: Herbert Jany, Erlangen; Reinhardt Strobel, Nuremberg, both of Fed. Rep. of Germany

[73] Assignee: Siemens Aktiengesellschaft, Munich, Fed. Rep. of Germany

[21] Appl. No.: 418,688

[22] Filed: Oct. 2, 1989

Related U.S. Application Data

[63] Continuation of Ser. No. 222,265, Jul. 21, 1988, abandoned.

[30] Foreign Application Priority Data

Jul. 24, 1987 [DE] Fed. Rep. of Germany ....... 3724587

[51] Int. Cl.$^5$ .............................................. F16B 39/00
[52] U.S. Cl. ................................. 376/463; 411/281; 411/937.2; 72/479
[58] Field of Search ............... 376/260, 446, 463; 411/280–283, 324, 336, 361, 937.2; 403/320; 81/125; 72/479, 342; 29/520, 243.5; 10/85

[56] References Cited

U.S. PATENT DOCUMENTS

| | | | |
|---|---|---|---|
| 1,603,618 | 10/1926 | McClellan | 411/277 |
| 2,487,129 | 11/1949 | Hallock | 10/85 |
| 3,295,581 | 1/1967 | Norlin et al. | 411/184 |
| 4,326,825 | 4/1982 | Volkman et al. | 411/361 |
| 4,759,237 | 7/1988 | Fauchet et al. | 411/281 |
| 4,768,908 | 9/1988 | Fauchet | 411/283 |

FOREIGN PATENT DOCUMENTS

| | | |
|---|---|---|
| 0130840 | 1/1985 | European Pat. Off. . |
| 2930207 | 4/1984 | Fed. Rep. of Germany . |
| 3329104 | 2/1985 | Fed. Rep. of Germany . |
| 0331979 | 4/1903 | France . |
| 2138913 | 10/1984 | United Kingdom . |

*Primary Examiner*—Daniel D. Wasil
*Attorney, Agent, or Firm*—Laurence A. Greenberg; Herbert L. Lerner

[57] ABSTRACT

An apparatus for form-locking torsion prevention in screw connections includes a bolt with a standard bolt thread and a special nut having a free end and nut threads. A thin-walled sheath is disposed on the free end of the special nut. An integral cross-sectional portion intended for deformation is in the form of a bead supported on the thin-walled sheath. The nut thread extends uninterruptedly through the sheath and the bead. The bolt thread extends through the bead. A thrust pad is pressed axially onto the bead and has a conically narrowing bore formed therein in which the bead is substantially radially plastically deformed and forced inward into the bolt thread.

11 Claims, 3 Drawing Sheets

APPARATUS FOR FORM-LOCKING TORSION PREVENTION IN SCREW CONNECTIONS

This application is a continuation, of application Ser. No. 222,265, filed July 21, 1988, now abandoned.

The invention relates to an apparatus for form-locking torsion prevention in screw connections, preferably used for remotely-controllable underwater disposition in reactor pressure vessels of nuclear power plants, including standard bolt threads and a special nut with an integrally formed-on cross-sectional part intended for deformation. A form-locking connection is one which connects two elements together due to the shape of the elements themselves, as opposed to a force-locking connection, which locks the elements together by force external to the elements.

An apparatus of this kind is known from German Published, Non-Prosecuted Application DE-OS 29 30 207. In this prior art apparatus, the special nut has a disk protruding radially in flange-like fashion at the end thereof resting on the component to be retained, and this disk is brought into form-locking engagement with the component to be retained. Since this disk must be integral with the nut, the manufacture thereof entails an extremely large amount of metal cutting and an undesirably large amount of waste of material. Another disadvantage in the known apparatus is that the wall thickness of the disk must be relatively thin, in view of the maximum allowable force for deforming it, and only a correspondingly relatively low torque is therefore needed to loosen the torsion prevention means.

It is accordingly an object of the invention to provide an apparatus for form-locking torsion prevention in screw connections, which overcomes the hereinafore-mentioned disadvantages of the heretofore-known devices of this general type, which is remotely-controllable, which is capable of loosening under certain conditions, which avoids the need for additional components, and in which the nut and threaded bolt are held together in a captive manner. In addition, economical exploitation of the material used in the manufacture of the device should also be assured.

With the foregoing and other objects in view there is provided, in accordance with the invention, an apparatus for form-locking torsion prevention in screw connections, preferably used for remotely-controllable underwater disposition in reactor pressure vessels of nuclear power plants, comprising a bolt with a standard bolt thread; and a special nut having a free end and nut threads; a thin-walled sheath disposed on the free end of the special nut, an integral or formed-on cross-sectional portion intended for deformation in the form of a bead supported on the thin-walled sheath; the nut thread extending uninterruptedly through the sheath and the bead, the bolt thread extending through the bead: and a thrust pad being pressed axially onto the bead and having a conically narrowing bore formed therein in which the bead is substantially radially plastically deformed and forced inward into the bolt thread.

In accordance with another feature of the invention, there are provided ribs distributed uniformly in axially parallel planes over the periphery of the thrust pad in the conically narrowing bore, reinforcing the radial deformation of the bead at given locations.

In accordance with a further feature of the invention, the bolt thread has a portion thereof cut away in the vicinity of the bead.

In accordance with an added feature of the invention, the bolt thread is locally deformed in the vicinity of the bead by the bead being forced into the bolt thread.

In accordance with an additional feature of the invention, the special nut has a total height in axial direction being substantially twice as large as the outside diameter of the thread.

In accordance with yet another feature of the invention, the special nut has a portion with the sheath and the bead and a remaining portion, and the sheath and the bead have a combined axial dimension being less than the height of the remaining portion in axial direction.

In accordance with yet a further feature of the invention, the thrust pad is locked or self-locked on the bead at a given location, and the conically tapering bore has a conical region disposed outside the given location.

In accordance with a concomitant feature of the invention, there are provided means for hydraulically actuating the thrust pad.

The apparatus for form-locking torsion prevention in screw connections according to the invention is highly advantageous, because it can be applied simply and above all by remote control, and because the special nut and the threaded bolt are held together in virtually captive fashion. Moreover, since separate securing elements such as washers are dispensed with, close tolerances are made possible, and by avoiding additional mold seams, settling caused by such seams does not arise.

Other features which are considered as characteristic for the invention are set forth in the appended claims.

Although the invention is illustrated and described herein as embodied in an apparatus for form-locking torsion prevention in screw connections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2 is a greatly enlarged, fragmentary, sectional view of a special nut which has been screwed-on;

Figure 1:
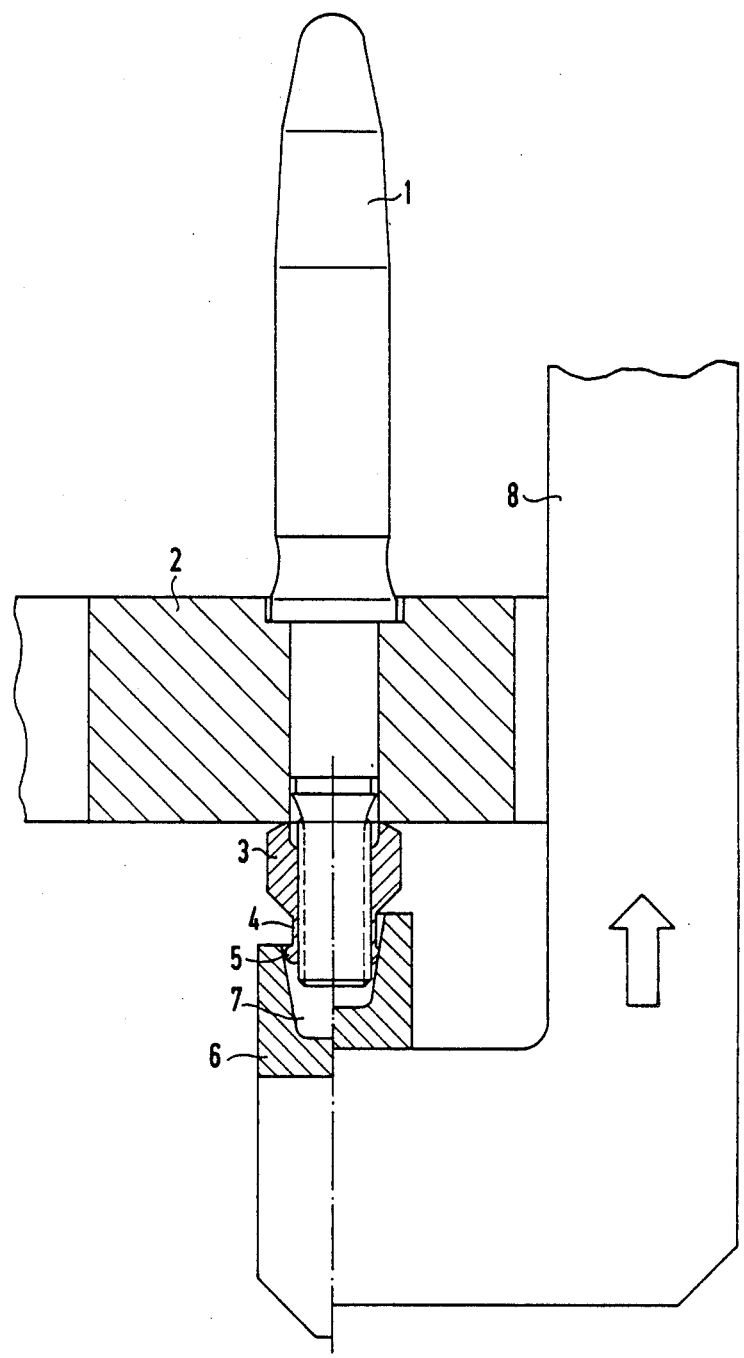
FIG. 1 is a fragmentary, longitudinal-sectional view of securing means of a guide bolt having a thrust pad mounted or pressed thereon.
Figure 2:
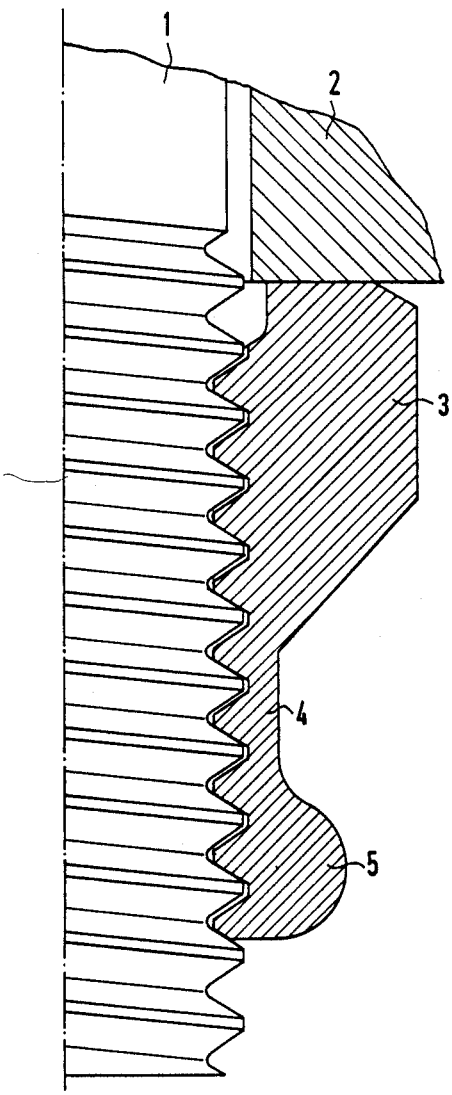
Figure 3:
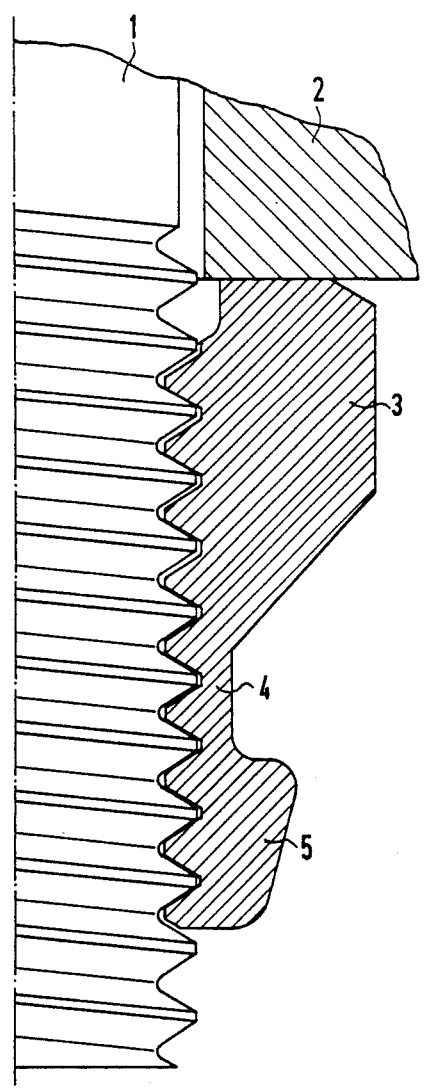
FIG. 3 is a view similar to FIG. 2 showing a deformed special nut.

Referring now in detail to the figures of the drawings in which elements that correspond to one another are identified by the same reference numerals in all of the figures and first, particularly, to FIG. 1 thereof, there is seen an upwardly pointing guide pin 1 for nuclear reactor fuel assemblies which is guided at the lower portion thereof in a grid plate 2 that is only shown in part, and is retained therein by a special nut 3. The special nut 3 has a bead 5 on a thin-walled sheath 4. The portion of the nut above the sheath 4 is referred to as the main portion. The thread of the nut extends uninterruptedly over the entire length of the special nut as well as over the sheath 4 and the bead 5 carried by the nut. The length of the thread in the special nut alone, without the sheath 4 and the bead 5, is at least as long as the length of the thread in standard nuts. The thread of the bolt of the guide pin 1 penetrates the entire length of the special nut 3, the sheath 4 and the bead 5.

The special nut 3 may be constructed as a round or circular nut, a square nut, a hexagonal nut or in some other desirable cross-sectional shape. The sheath 4 and bead 5 are of circular-annular cross section.

The bolt thread of the guide pin 1 in the illustrated embodiment is uninterrupted. However, in c non-illustrated manner it is also either provided with recesses in the circumferential direction, or individual thread turns are absent, particularly at the level of the bead 5, or they deviate in shape from the standard cross section.

After the special nut 3 has been screwed on, it is first tightened in a non-illustrated manner using the prescribed torque. Subsequently, a thrust pad, bar or piece 6 having a bore 7 that tapers down conically in the axial direction is axially placed upon the bead 5 and pressed by a preferably hydraulically actuated tong arm 8 toward the bead 5. During this process, the bead 5 is deformed plastically, substantially in the radial direction. This deformation also extends to the inside of the bead 5, which in turn deforms the thread turns or courses of the bolt thread located in the vicinity of the bead 5 and subsequently encompasses or envelopes them without play.

Figure 4:
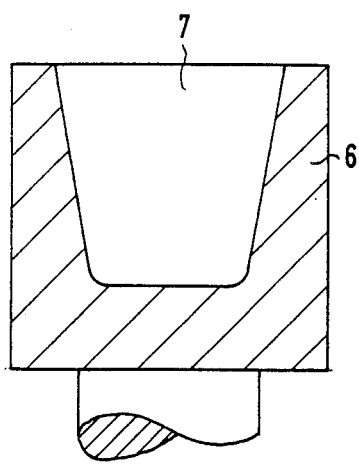
FIGS. 4 and 5 are respective sectional and plan views of a thrust pad having a smooth conical bore.
Figure 5:
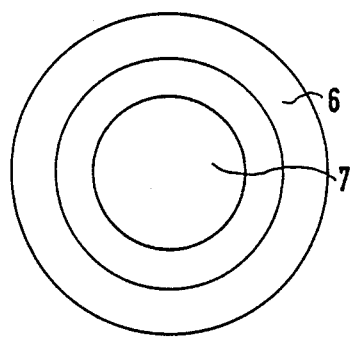

When a thrust pad 6 as shown in FIGS. 4 and 5 is used, the bead 5 and thus the portion of the bolt thread located beneath it are deformed uniformly over the periphery of the bead, which requires a moderately large pressing force.

Figure 6:
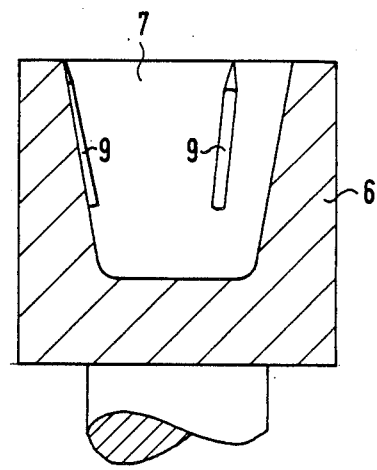
FIGS. 6 and 7 are respective sectional and plan views of a thrust pad having ribs provided in axially parallel planes of the conical bore.
Figure 7:
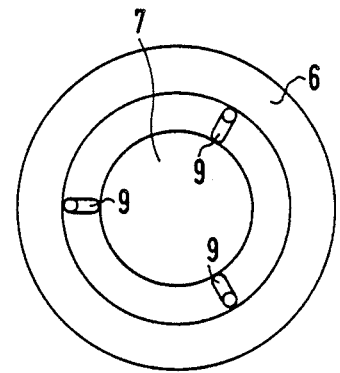

On the other hand, the embodiment of the thrust pad 6 which has ribs 9 located on axially parallel planes, as shown in FIGS. 6 and 7, permits markedly lower pressing forces to be used in order to attain equally good torsion-preventing deformation of the bead 5. The ribs 9 are distributed uniformly over the periphery of the bore 7, so that the thrust pad constructed in this way is self-centering. The forcing of the ribs 9 into the bead 5 deforms the bead locally much more severely at the locations facing the ribs 9, than at the peripheral sections located between the ribs 9, and the deformation of the bolt thread is also distributed unevenly over the periphery.

In a test, a special nut 3 provided with an M 14 thread was tightened with 75 Nm of biasing torque, it was released after one minute, and then braced with a rated torque of 60 Nm. Subsequent to the ensuing deformation of the bead 5, a releasing moment of 45 Nm was ascertained. However, upon further loosening rotation, the moment rose very quickly to over 120 Nm, in the process of which the bead 5 did not rotate with the nut and functioned like a check nut. Upon further forceful loosening of the special nut 3, the sheath 4 was destroyed, and complete loosening of the special nut 3 was subsequently possible only after the free end of the threaded bolt was cut off from the guide pin 1.

Use of the apparatus according to the invention for form-locking torsion prevention is therefore indicated wherever a nut must be reliably prevented from falling off even after it has been independently and unintentionally loosened.

The foregoing is a description corresponding in substance to German Application P 37 24 587.2, dated July 24, 1987, the International priority of which is being claimed for the instant application, and which is hereby made part of this application. Any material discrepancies between the foregoing specification and the aforementioned corresponding German application are to be resolved in favor of the latter.

We claim:

1. Apparatus for form-locking torsion prevention in a screw connecting having a bolt with a bolt thread, comprising
    a special nut having two nut ends and a nut thread;
    said nut having a main portion with an end of said main portion between said nut ends and a wall with a given thickness, said wall forming a nut end, a sheath disposed on said end of said main portion, said sheath having a wall with a thickness being substantially smaller than said given thickness, and an integral cross-sectional portion intended for deformation in the form of a bead supported on said sheath, said bead forming a nut end, said bead having a wall thickness being substantially larger than said thickness of said wall of said sheath;
    said nut thread extending entirely through said sheath and said bead and at least partly through said main portion, the bolt thread extending entirely through said main portion, said sheath and said bead; and
    a thrust pad to be pressed axially onto said bead when said nut is screwed onto said bolt, said thrust pad having a conically narrowing aperture formed therein, and said bead being substantially radially plastically deformed and forced into the bolt thread when said thrust pad is pressed onto said bead, said wall thickness of said sheath being thin enough to cause said sheath to be destroyed upon forceful loosening of said nut from the bolt.

2. Apparatus according to claim 1, including ribs distributed uniformly in axially parallel planes over the periphery of said thrust pad in said conically narrowing bore, reinforcing the radial deformation of said bead at given locations.

3. Apparatus according to claim 1, wherein said bolt thread is locally deformed in the vicinity of said bead by said beads being forced into said bolt thread.

4. Apparatus according to claim 1, wherein said main portion of said special nut has a total height in axial direction being substantially twice as large as the diameter of said nut thread.

5. Apparatus according to claim 1, wherein said sheath and said bead have a combined axial dimension being less than the height of said main portion in axial direction.

6. Apparatus according to claim 1, wherein said thrust pad is locked on said bead at a given location, and said conically tapering bore has a conical region disposed outside said given location.

7. Apparatus according to claim 1, including means for hydraulically actuating said thrust pad.

8. A special nut assembly, comprising
    first and second ends,
    a main portion having an interior and a wall with a given thickness, said wall forming said first end,
    a middle portion disposed on said main portion including an interior and a sheath having a sheath wall with a thickness being substantially smaller than said given thickness,
    said thickness of said sheath wall being small enough to cause said middle portion to be destroyed upon forceful loosening of said special nut assembly, an annular bead portion having an interior and being disposed on said middle portion and remote from said main portion, said bead portion being plastically deformable and including a bead having a bead wall with a thickness being substantially larger than said thickness of said sheath wall, said bead forming said second end, and a thread extending entirely through said interiors of said middle portion and said bead portion and at least partly through said interior of said main portion.

9. The special nut assembly according to claim 8, wherein said main portion, said middle portion and said bead are one piece and made from the same material.

10. The special nut assembly according to claim 8, including a thrust pad having a conically narrowing aperture formed therein for receiving said bead.

11. The special nut assembly according to claim 10, including means for pressing said thrust pad axially along said bead.

* * * * *